United States Patent [19]

Cornforth et al.

[11] 4,390,956
[45] Jun. 28, 1983

[54] APPARATUS FOR CORRECTING MEASURED GAS FLOW

[75] Inventors: Malcolm W. Cornforth, Edgewater Park, N.J.; Robert S. Jacobsen, Hatboro, Pa.

[73] Assignee: The Singer Company, Stamford CT

[21] Appl. No.: 241,328

[22] Filed: Mar. 6, 1981

[51] Int. Cl.³ ............................................. G01F 1/00
[52] U.S. Cl. .................................. 364/510; 364/571; 377/21; 73/861.03
[58] Field of Search ............... 364/509, 510, 571, 497, 364/707; 235/92 FL; 73/861.02, 861.03, 861.79; 377/21

[56] References Cited

U.S. PATENT DOCUMENTS

| | | | |
|---|---|---|---|
| 3,701,280 | 10/1972 | Stroman | 73/861.02 |
| 3,729,995 | 5/1973 | Kovacs et al. | 364/571 |
| 3,752,393 | 8/1973 | Moseley | 364/510 |
| 3,755,806 | 8/1973 | Bunting | 364/707 |
| 4,056,717 | 11/1977 | Cornforth | 364/510 |
| 4,149,254 | 4/1979 | Molusis | 364/510 |
| 4,173,891 | 11/1979 | Johnson | 364/510 |
| 4,238,825 | 12/1980 | Geery | 364/571 |
| 4,253,156 | 2/1981 | Lisle et al. | 364/510 |

Primary Examiner—Gary Chin
Attorney, Agent, or Firm—David L. Davis; Robert E. Smith; Edward L. Bell

[57] ABSTRACT

A gas flow volume corrector mounted on a flow meter is provided with a microprocessor which calculates a corrected volume each time the meter measures a unit volume of flowing gas. Customer supplied data as to base conditions, specific gravity and gas composition are utilized to calculate supercompressibility values. These values are then processed to provide a plurality of constants which define calculation equations. The constants are stored in the corrector on a diode matrix card or PROM and are utilized each time the meter measures a unit volume of flowing gas for calculating the corrected volume. To conserve memory space, integer arithmetic, rather than floating point arithmetic, is utilized in the calculations.

17 Claims, 11 Drawing Figures

Fig. 6
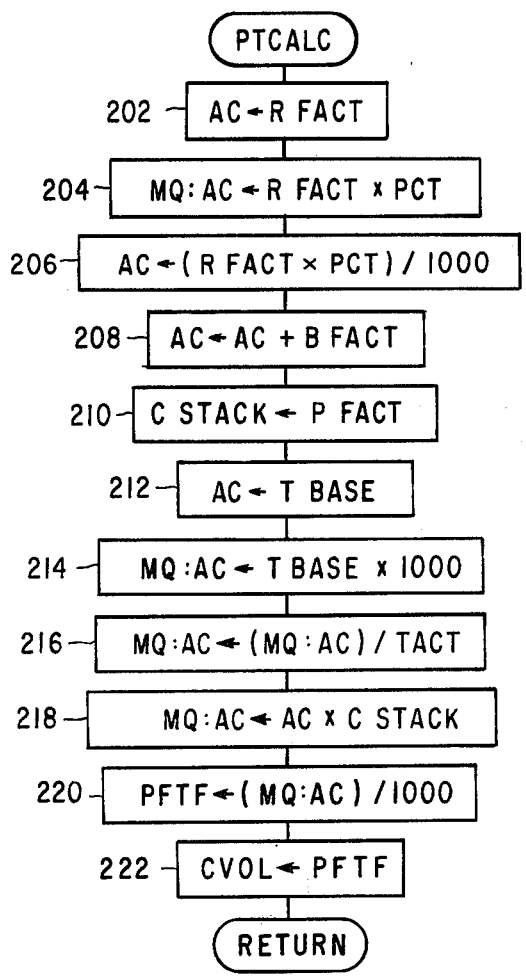
Fig. 8
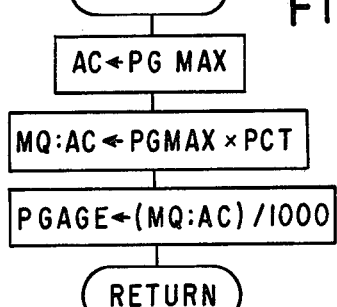
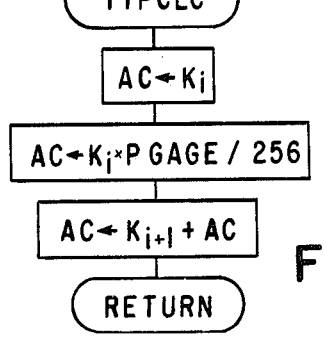
Fig. 9
Fig. 7
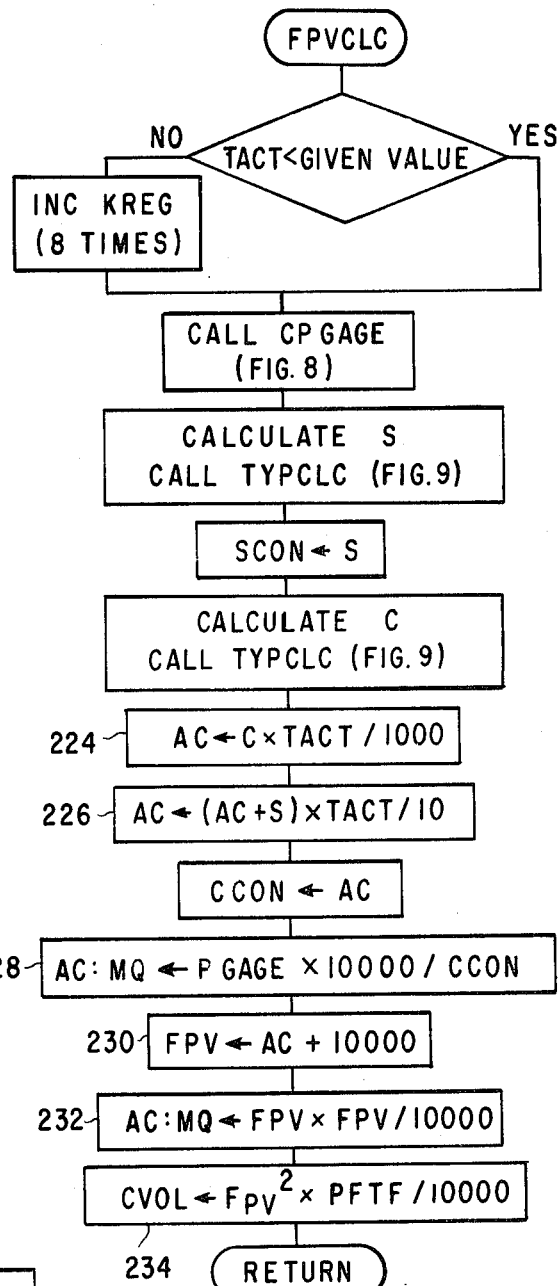

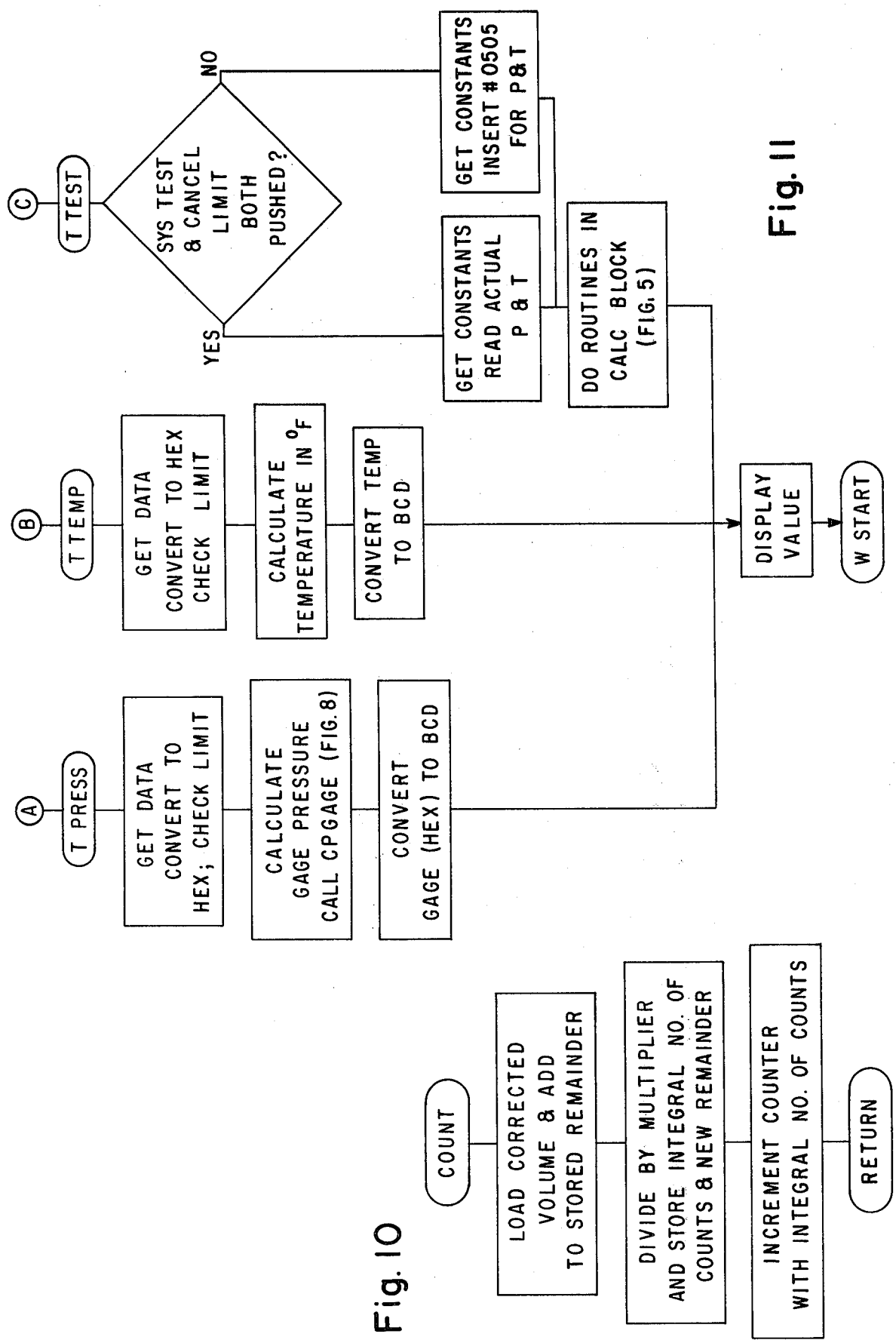

APPARATUS FOR CORRECTING MEASURED GAS FLOW

BACKGROUND OF THE INVENTION

This invention relates to gas flow measurements and, more particularly, to the correction of a measured unit volume of gas flowing through a conduit to a base volume at given base conditions of base pressure and base temperature.

Gas is a compressible item, the volume of which changes as a function of temperature and pressure, in accordance with well known physical laws. Because gas is a compressible commodity, the buyer and seller of this commodity must agree upon the same conditions. Thus, to distribute and sell gas that is exposed to varying conditions of temperature and pressure, calculations must be made to convert the measured gas flow volume $V_f$ in terms of cubic feet at varying conditions of temperature $T_f$ and pressure $P_f$, to a standard cubic feet volume $V_b$ at specified, previously agreed upon base temperature $T_b$ and base pressure $P_b$.

The basic gas law equation of state is $$PV = WRTZ \tag{1}$$

where:
P is pressure
V is volume
W is mass
R is gas constant
T is temperature
Z is compressibility.

When dealing with a simple gas, such as $N_2$ or $O_2$, the classic gas laws serve very well, and Z may not be needed. However, when there are mixtures of gases and complex hydrocarbons, it has been found that Boyle's and Charles' laws are in error. Fuel gases tend to be easier to compress, up to around 2000 psig, than these laws would suggest. Above this pressure, the trend is reversed. The exact values are functions of the pressure, temperature and the gas composition. The difference between the classic gas laws and the complex gas compression is called compressibility, or Z.

From equation (1), the following relationship between base and flowing conditions may be derived:

$$V_b = V_f \frac{P_f + P_a}{P_b} \frac{T_b}{T_f} (F_{pv})^2 \tag{2}$$

where:
$V_b$ is base volume
$V_f$ is the measured uncorrected volume
$P_f$ is the flowing gas gage pressure
$P_a$ is atmospheric pressure
$P_b$ is base pressure
$T_b$ is base temperature in degrees Rankine
$T_f$ is the temperature of the flowing gas in °R
$F_{pv}$ is the supercompressibility factor which is equal to $$\sqrt{\frac{Z \text{ base}}{Z \text{ flowing}}}$$

The difficult part of calculating base volume in accordance with equation (2) is to determine the supercompressibility factor which is a function of the flowing temperature and pressure as well as the specific gravity and the composition of the gas being measured. One way of determining the supercompressibility factor is to utilize tables such as those set forth in the "Manual for the Determination of Supercompressibility Factors for Natural Gas", PAR Research Projects NX-19, published by the American Gas Association. However, if it is desired to automate the correction of measured gas flow, it is difficult and expensive to utilize tables. Alternatively, it is possible to utilize a series of equations to calculate the supercompressibility factor. U.S. Pat. No. 4,173,891 discloses such an automated system including a microprocessor for repetitively calculating the supercompressibility factor. The method employed by the patented system includes a plurality of computing steps for each calculation of the base natural gas flow. During each computing step, an initially approximated value of the supercompressibility factor or the previously calculated value is used to calculate an indication of the base natural gas flow, each computing step being insufficient to recalculate the supercompressibility factor, this calculation taking a plurality of steps. Therefore, the disclosed system has the disadvantage that a relatively large amount of time is required each time the supercompressibility factor is to be calculated. In fact, it requires five input meter pulses for a complete calculation to be performed. Another disadvantage of the system disclosed in this patent is that the calculations are performed utilizing floating point arithmetic, which requires a large amount of memory capacity, increasing the cost of the system hardware.

It is therefore an object of this invention to provide apparatus for measuring gas flow.

It is a further object of this invention to provide such apparatus which automatically corrects the measured gas flow to predetermined base conditions of temperature and pressure.

It is another object of this invention to provide such apparatus wherein the corrected values are efficiently calculated.

It is yet another object of this invention to provide such apparatus wherein it is relatively easy to make adaptations for different base conditions and gas composition.

It is still another object of this invention to provide such apparatus which can be utilized at remote meter locations without the necessity for connection to an external source of power.

SUMMARY OF THE INVENTION

The foregoing and additional objects are attained in accordance with the principles of this invention by providing apparatus for correcting a measured unit volume of gas flowing through a conduit to a base volume at given base conditions of base pressure and base temperature. The apparatus includes temperature and pressure transducers which provide signals corresponding to their measurements of the temperature and pressure, respectively, of the flowing gas. A meter connected in the conduit measures the uncorrected volume of the flowing gas and provides to the apparatus a volume pulse in response to measuring a unit volume of the gas. A set of constants derived from customer supplied data as to base conditions and gas content are stored in the apparatus on a diode matrix card. In response to the occurrence of a volume pulse, the stored constants and the measured temperature and pressure values are utilized for performing a series of calculations to derive the supercompressibility factor and in turn a corrected volume. All calculations are performed utilizing integer arithmetic, rather than floating point arithmetic, in order to efficiently utilize memory and achieve a cost saving. The output of the apparatus is a first counter which indicates the uncorrected volume and a second counter which indicates the corrected volume.

In accordance with an aspect of this invention, a test unit is provided which may be plugged into the apparatus and is powered thereby. This test unit does not interfere with the operation of the apparatus or the meter. The test unit can be activated to display flowing pressure and temperature, to cancel out of limit indications, to verify system operation and also may be utilized to test the apparatus counter.

DESCRIPTION OF THE DRAWINGS

The foregoing will be more readily apparent upon reading the following description in conjunction with the drawings wherein:

FIGS. 6 through 11 are flow diagrams of subroutines which form a part of the system operation shown in FIG. 5.

DETAILED DESCRIPTION

Figure 1:
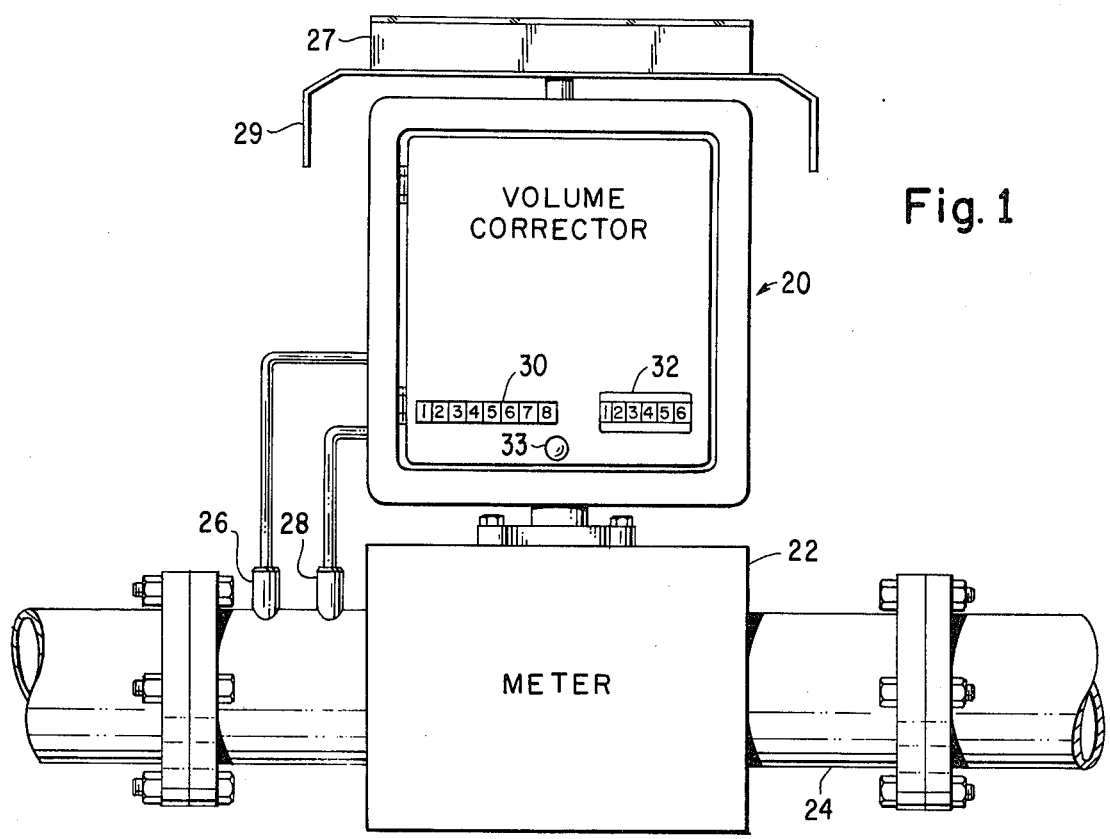
FIG. 1 illustrates the mounting of volume corrector apparatus constructed in accordance with the principles of this invention and its relationship to a meter connected in a conduit.

Referring now to the drawings, wherein like elements in different figures thereof have the same reference character applied thereto, FIG. 1 illustrates volume corrector apparatus, designated generally by the reference character 20, mounted on a meter 22 connected in a conduit 24 through which gas flows. The meter 22 does not form a part of the present invention and may be any type of meter so long as it satisfies the requirement that the corrector 20 needs a low speed input derived from the output register drive shaft of the meter 22. Alternatively, the corrector 20 may be mounted remotely from the meter 22 and in this case, the input to the corrector 20 will be an electrical switch closure derived from the output register drive shaft of the meter 22, in a manner well known in the art. The corrector 20 also derives input signals from a temperature transducer 26 and a pressure transducer 28 which extend into the conduit 24. The temperature transducer 26 is illustratively a model AC2626K temperature transducer manufactured by Analog Devices and is an integrated circuit housed in a stainless steel tubular probe which produces an output current linearly proportional to absolute temperature. The pressure transducer 28 is illustratively a model ITQH-24 pressure transducer manufactured by Kulite Semiconductor Products and includes a solid state sensing element which is a monolithic integrated circuit Wheatstone bridge directly formed on a silicon diaphragm, and is available in different ranges, depending upon the desired application. The output of the pressure transducer 28 is a voltage which is related, over the range, to the pressure of the gas flowing through the conduit 24.

Since the corrector apparatus 20 is designed for use at remote locations, such as in a desert area, where commercially available power may not be available, the apparatus 20 is designed to be battery operated. Further, a solar battery charger 27 may be provided mounted above the apparatus 20. If the enclosed corrector apparatus 20 were to be exposed to direct sunlight, its interior temperature would rise to an unacceptable level. Therefore, a sunshade 29 is also provided to shield the apparatus 20 from the direct rays of the sun.

The corrector apparatus 20 has as its output two counters. A first counter 30 is a mechanical counter which displays the uncorrected volume. The counter 30 is incremented by rotation of the output register drive shaft of the meter 22. If the corrector 20 is not mounted on the meter 22, the uncorrected counter 30 is replaced by the original meter register. The second counter 32 is the corrected counter and is an electromechanical or electronic counter which displays the corrected volume. It is incremented by signals generated within the corrector 20 in response to inputs from the meter 22 and calculations based upon measured temperature and pressure, in a manner to be described in detail hereinafter. The corrector apparatus also includes a low battery indicator 33.

Figure 2:
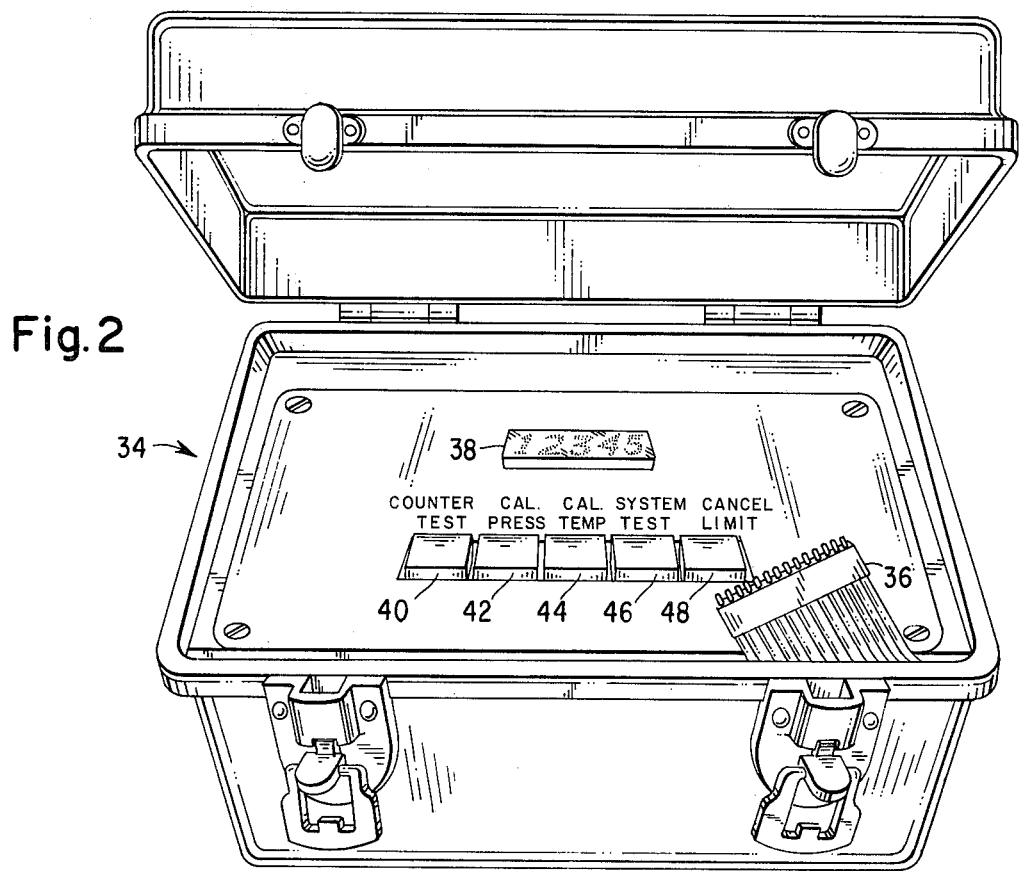
FIG. 2 illustrates a test unit, constructed in accordance with the principles of this invention, which may be plugged into the volume corrector apparatus shown in FIG. 1.

FIG. 2 illustrates a test unit, denoted generally by the reference numeral 34, which is a portable instrument used in the shop and field to check the operation of the corrector 20. The test unit 34 includes a cable and connector assembly 36 which plugs into a suitable receptacle, not shown, in the corrector 20. Power for the test unit 34 is obtained from the corrector 20. The test unit 34 includes a numerical display 38 and a plurality of test buttons 40, 42, 44, 46 and 48. When the test unit 34 is coupled to the corrector 20 via connector assembly 36, the counter 32 may be checked by depressing the button 40. When the button 40 is depressed, the counter 32 is advanced one count. The flowing pressure may be read directly on the display 38 by depressing the button 42. The flowing temperature may be read directly in °C. or °F. on the display 38 by depressing the button 44. When the button 46 is depressed, the display 38 will display a number which has been determined to be the "signature" of the corrector 20 when it is operating correctly. If the display 38 displayed colons along with numbers when any of the buttons 42, 44 or 46 was depressed, this indicates that some time after the last check was made either the pressure or temperature was out of specified limits. The display of colons will not indicate which parameter was out of limit or if the high or low limit was exceeded. Depressing the button 48 will remove the colons from the display 38 and reset the corrector 20. When the buttons 46 and 48 are depressed simultaneously, the display 38 will display a number indicating the correction multiplier for the presently flowing conditions of pressure and temperature.

When a customer places an order for a corrector 20 to be used at a particular location, the customer also specifies certain conditions at that location. The customer must specify the type of flowing gas which is to be measured, its composition, the range of pressures at which the gas will flow, and the base temperature and pressure to which the flow volume is to be corrected. These values are utilized to calculate a series of constants which are stored in the corrector 20 for subsequent utilization in making correction calculations. Before the operation of the corrector 20 is described in further detail, at this point a description of the mathematical basis for its operation is in order.

An examination of the compressibility tables for any gas within the range for which the corrector apparatus 20 is designed for use, will provide the supercompressibility factor which is proportional to pressure divided by temperature. It can be assumed that the following relationship holds:

$$F_{pv} - 1 = (P_f/QT_f). \tag{3}$$

Then, $$Q = \frac{P_f}{(F_{pv} - 1)T_f}. \tag{4}$$

Examining a table of values of Q indicates that in the range of temperatures being considered, i.e. $T_f = 520 \pm 80$, a linear fit of Q as a function of $T_f$ is possible. In fact, two fits are actually required, one for $T_f$ below a given value and one for $T_f$ above that given value. Therefore, let:

$$Q = S + CT_f. \tag{5}$$

In addition, C and S can be expressed as linear equations which are functions of the pressure $P_f$. Then, a form as shown below can be derived:

$$S = K_{i+1} + K_i(P_f/256) \tag{6}$$

and $$C = K_{i+3} + K_{i+2}(P_f/256) \tag{7}$$

where $i = 1$ when $T_f$ is less than a given value and $i = 5$ when $T_f$ is greater than or equal that given value.

Figure 3:
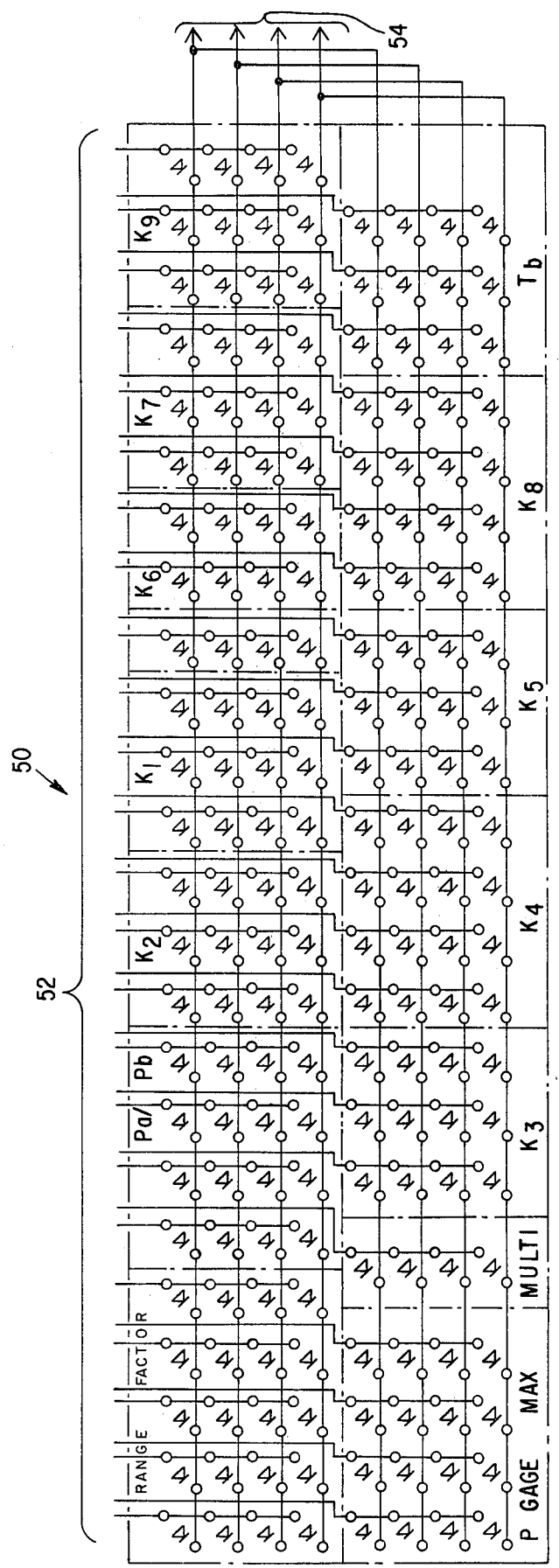
FIG. 3 illustrates a diode matrix board which forms a part of the volume corrector apparatus and is used for storing constants derived from customer supplied data.

Thus, based upon customer supplied data, the K constants are calculated. These constants $K_1$-$K_8$ are stored within the corrector 20 on a diode matrix card 50 as shown in FIG. 3. Additionally, a constant $K_9$ which equals 256 (utilized in equations (6) and (7) is stored on the card 50. The card 50 stores these values in binary coded decimal (BCD) and when voltages are applied to the appropriate leads 52, the leads 54 are selectively energized in a manner well known in the art. Additionally, the matrix card 50 stores the base pressure factor B which equals the atmospheric pressure divided by the base pressure, the maximum gage pressure for which readings are accurate, the range factor R of the pressure transducer 28 which equals the maximum gage pressure divided by the base pressure, the counter multiplier and the base temperature $T_b$. These values are stored on the diode matrix card 50 by selectively connecting diodes between the leads 52 and the leads 54, as is well known in the art, in a BCD format. Alternatively, the diode matrix card 50 may be replaced by a programmable ROM.

The mathematics utilized in calculating the supercompressibility factor and, accordingly, the corrected volume, utilizing the measured pressure and temperature and the constants stored on the diode matrix card 50, in response to an input meter pulse, will now be described. Utilizing the stored constant values and the measured pressure and temperature, the following calculations are performed:

$$X_1 = RP/1000 \tag{8}$$

$$X_2 = 1000T_b/T_f \tag{9}$$

$$X_3 = X_1 + B \tag{10}$$

$$X_4 = X_2X_3/1000 \tag{11}$$

where:
R is the range factor of the pressure transducer 28, which is stored on the diode matrix card 50
P is the measured pressure and varies from 0 to 1000 as a linear proportion of the range of the pressure transducer 28
$T_b$ is the base temperature in degrees Rankine, and is stored on the diode matrix card 50
$T_f$ is the flowing temperature in degrees Rankine and equals the temperature measured by the temperature transducer 26 (in degrees Fahrenheit) plue 460
B is the base factor and equals the atmospheric pressure divided by the base pressure, this constant being stored on the diode matrix card 50.

Next, S and C are calculated from equations (6) and (7), utilizing the constants stored on the diode matrix card 50 (depending upon the measured temperature) and the measured pressure. Utilizing the calculated values of S and C, and the measured temperature and pressure, the following equations (12)–(16) are utilized to calculate the supercompressibility factor $F_{pv}$.

$$C_1 = CT_f/1000 \tag{12}$$

$$C_2 = C_1 + S \tag{13}$$

$$C_3 = T_fC_2/10 \tag{14}$$

$$C_4 = 10000P_g/C_3 \tag{15}$$

$$F_{pv} = 10000 + C_4 \tag{16}$$

where $P_g$ is the gage pressure and equals the measured pressure P times the maximum gage pressure.
The following equations (17) and (18) are then utilized to calculate the corrected volume $V_c$:

$$F_z = (F_{pv})^2/10000 \tag{17}$$

$$V_c = X_4F_z/10000. \tag{18}$$

To increment the counter 32, the following equation (19) is utilized to get a corrected count $V'_c$, where M is the counter multiplier stored on the diode matrix card 50:

$$V'_c = V_c/M. \tag{19}$$

In the volume corrector apparatus 20, the foregoing calculations are performed each time a pulse is received from the meter 22. These calculations are performed utilizing integer arithmetic to avoid the cost of floating point arithmetic. It has been determined that the accuracy of the above calculations is to within $\pm 0.1\%$.

Figure 4:
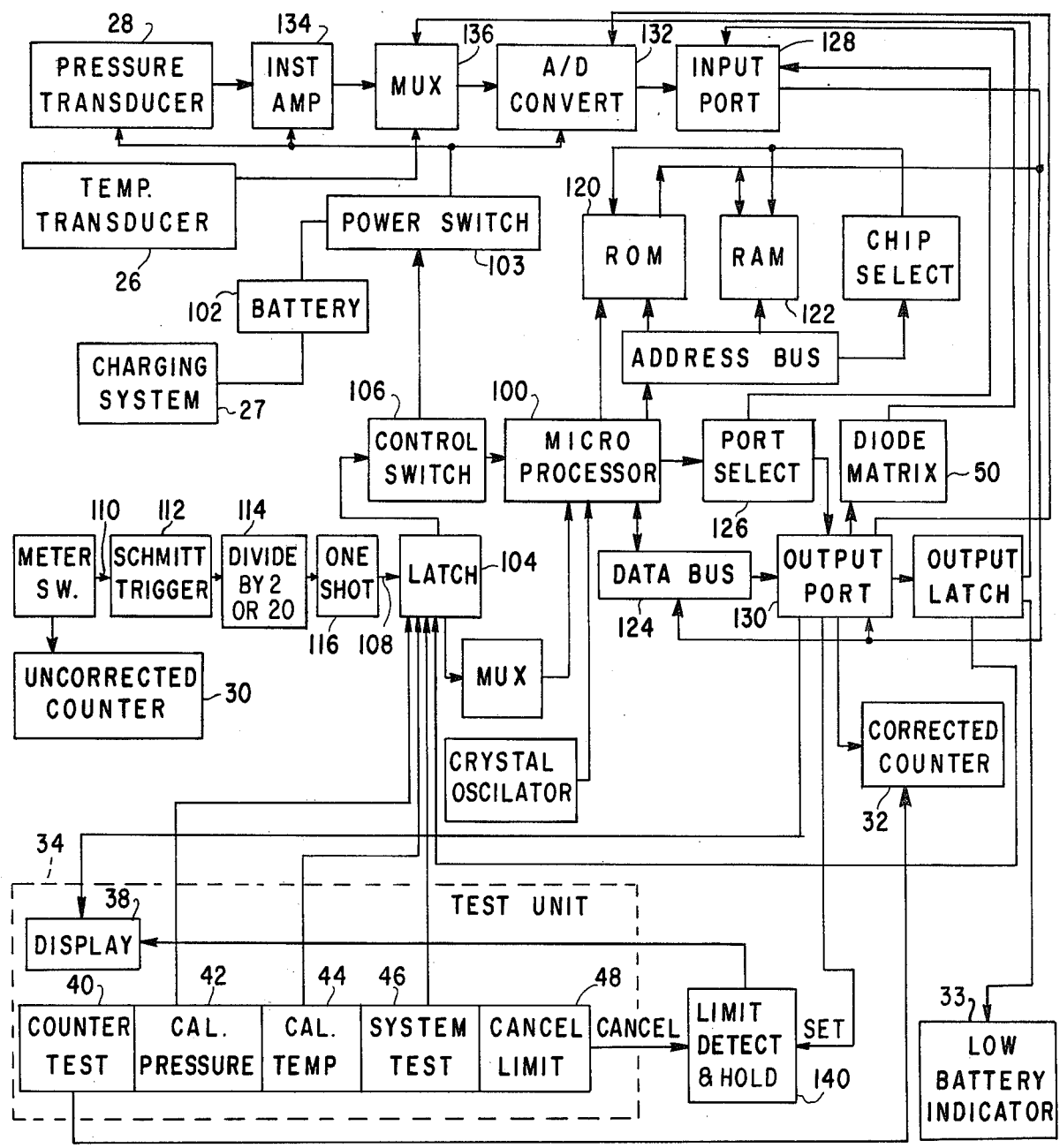
FIG. 4 is a block diagram of the illustrative volume corrector apparatus and test unit of FIGS. 1, 2 and 3.

Referring now to FIG. 4, shown therein is an overall block diagram of volume corrector apparatus operating with accordance with the present invention, as described above. All the functions of the volume corrector apparatus shown in FIG. 4 are controlled by a microprocessor 100, illustratively a type 1802 microprocessor manufactured by RCA Corporation. The corrector apparatus is battery powered, by battery 102, and in order to reduce quiescent battery drain, the temperature transducer 26 and the pressure transducer 28 are only energized through the power switch 103 when the microprocessor 100 requires inputs therefrom. An illustrative arrangement for reducing quiescent battery drain is disclosed in U.S. Pat. No. 4,056,717, and the reader is referred thereto if further details are desired. Whenever there is a signal at the output of the latch 104, through the control switch 106 to the microprocessor 100, the microprocessor 100 will start its internal program. An output from the latch 104 will occur in response to either a request from the test unit 34 or a meter input switch pulse over the lead 108. The meter input switch pulse is generated in response to rotation of the output register drive shaft of the meter 22. Illustratively, that shaft has mounted thereon a small permanent magnet. A switching device located in close proximity to the magnet will provide two pulses over the lead 110 for every complete rotation of the output register drive shaft. Each rotation of the output register drive shaft will also mechanically increment the uncorrected counter 30, in a manner well known in the art. The pulses over the lead 110 pass through a Schmitt trigger circuit 112 which functions as a squaring and debounce circuit, and then passes to the divide-by-two or divide-by-twenty circuit 114, so that only every other or every twentieth pulse will trigger the one shot circuit 116 to set the latch 104. The reason that a divide-by-twenty operation would be required is that if a large capacity meter with a ten foot drive is utilized, it is desirable to reduce the number of input pulses to the corrector apparatus in order to conserve the batteries. The latch 104 is also set by depression of any of the buttons 42, 44 or 46 when the test unit 34 is connected to the corrector 20.

The microprocessor 100 is controlled by a fixed program contained in the ROM 120. The RAM 122 is used for the temporary storage of variables and calculations. Whenever there is a signal at the output of the latch 104, the microprocessor 100 will start its program. An input meter pulse always has top priority and is always serviced regardless of information being requested by the test unit 34. The data bus 124 is a bidirectional signal highway from the ROM 120, the RAM 122, the output port 130 and the input port 123, to the microprocessor 100. The port select circuit 126 receives an output from the microprocessor 100 and directs signals to the input port 128 or the output port 130. When the input port 128 is selected, the data from the temperature transducer 26, the pressure transducer 28 and the diode matrix 50 is made available to the microprocessor 100 via the analog-to-digital converter 132. The output port 130 directs data to the test unit display 38, the corrected counter 32, and strobes the analog-to-digital converter 132 to convert the information on pressure and temperature, as will be described. The pressure transducer 28, through the instrument amplifier 134, or the temperature transducer 26, are coupled to the analog-to-digital converter 132 through the multiplexer 136. The multiplexer 136 outputs either temperature or pressure analog information to the analog-to-digital converter 132 which begins conversion upon receiving a start conversion signal from output port 130. The output from the analog-to-digital converter 132 is in sequential BCD, as controlled by the strobing from the output port 130 upon receiving a conversion complete signal from converter 132.

The "signature" of the corrector apparatus is the correction factor obtained by using 50.5% of the full scale value of maximum gage pressure, a temperature of 505° R., and all the values supplied by the customer and converted into the constants on the diode matrix card 50. This signature is calculated and displayed on the display 38 when the test unit 34 is connected to the corrector 20 and the button 46 is depressed. If either the button 42 or the button 44 is depressed, this will cause the microprocessor 100 to be held in either the pressure or temperature mode and display on the display 38 updated information as to the pressure and temperature for as long as either of the buttons 42 or 44 is depressed, unless a meter input pulse occurs. In the event that either the pressure or temperature is outside the operating limits set by the program in ROM 120, the limit detect and hold circuit 140 will be set which will cause the display 38 to display colons. If the cancel limit button 48 is depressed, this will reset the limit detect and hold circuit 140, cancelling the display of colons. However, should the over range condition still exist, the limit detect and hold circuit 140 will be reset immediately upon release of the cancel limit button 48 and the display of colons will return. Depressing buttons 46 and 48 simultaneously simulates a meter input pulse. The correction factor is displayed on the test unit display 38 but an output to the corrected counter 32 is inhibited.

Figure 5:
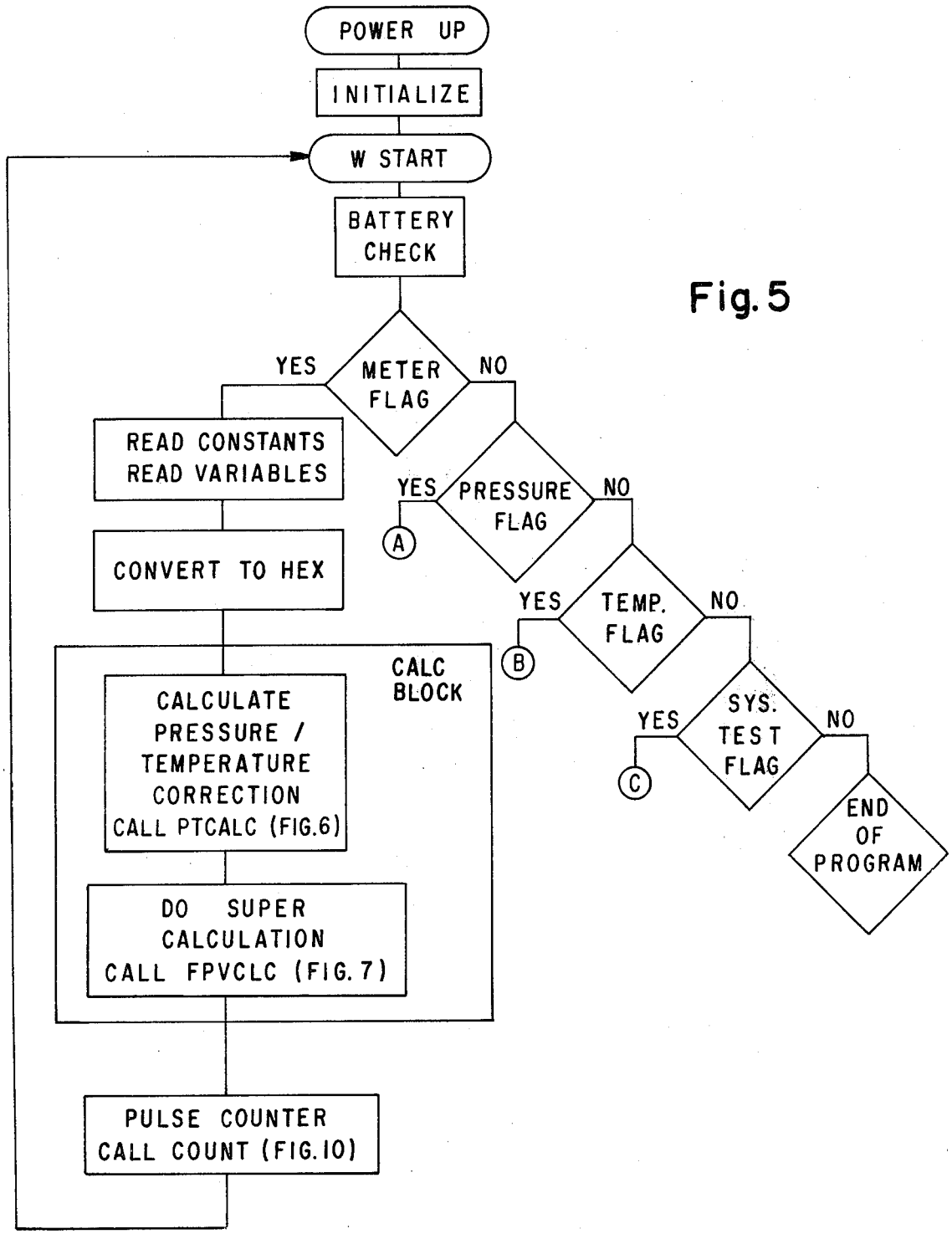
FIG. 5 is a flow diagram illustrating the overall system operation of the volume corrector apparatus constructed in accordance with the principles of this invention.

FIG. 5 is a flow diagram illustrating the overall operation of the system described above. This operation is controlled by the microprocessor 100 operating in accordance with a program stored in ROM 120. As shown in FIG. 5, when power is first applied to the corrector apparatus, an initialization routine is performed. The microprocessor 100 then goes into its WSTART (warm start) state where it awaits a signal from the control switch 106 that the latch 104 has been set. When such a signal is recognized the battery condition is checked. If the battery condition is okay then the program continues. If the battery condition is low then the program returns to WSTART and no calculations are performed. As described above, the first priority is an input meter pulse. In the event that the latch 104 was set in response to an input meter pulse, the microprocessor 100 must then collect all the data it requires for a correction calculation. This data is from the temperature transducer 26, the pressure transducer 28 and the constants stored on the diode matrix card 50. This data, which is in Binary Coded Decimal form, is converted to hexadecimal form for calculation purposes. This data is stored in the RAM 122.

The correction calculations are next performed. First, the PTCALC subroutine shown in FIG. 6 is performed. In that subroutine, blocks 202, 204 and 206 calculate $X_1$ utilizing equation (8). Blocks 208 and 210 calculate $X_3$ utilizing equation (10). Blocks 212, 214 and 216 calculate $X_2$ utilizing equation (9). Finally, blocks 218 and 220 calculate $X_4$ utilizing equation (11). The results of this calculation are then stored for later use, as shown by block 222. The program then returns to the main program where the next step is to do the supercompressibility calculation utilizing the FPVCLC subroutine shown in FIG. 7. In this subroutine, it is first determined whether the measured temperature is less than or greater than a given value so that the proper value of i is utilized for equations (6) and (7). First, the CPGAGE subroutine as shown in FIG. 8 is utilized to calculate the gage pressure. Next, the TYPCLC subroutine is utilized to calculate S, according to equation (6), as shown in FIG. 9. Then, again utilizing the TYPCLC subroutine, C is calculated utilizing equation (7). Next, as shown in block 224, $C_1$ is calculated utilizing equation (12). Then, as shown in block 226, $C_2$ and $C_3$ are calculated utilizing equations (13) and (14). Utilizing equation (15), $C_4$ is calculated as shown in block 228. Then, utilizing equation (16), $F_{pv}$ is calculated as shown in block 230. $F_z$ is then calculated utilizing equation (17), as shown in block 232. Finally, as shown in block 234, the corrected volume is calculated utilizing equation (18). Control is then returned to the main program.

After the corrected volume has been calculated, the COUNT subroutine (FIG. 10) is called to update the corrected counter 32. As shown in FIG. 10, the corrected volume which was calculated is added to a remainder value from a previous calculation. This sum is then divided by the counter multiplier which results in an integral number of counts plus a new remainder, both of which are stored in the RAM 122. The integral number of counts is then utilized to increment the corrected counter 32. Control is then returned to the main program which remains in the WSTART state awaiting another input pulse from the control switch 106.

In the event that the latch 104 is set in response to an input from the test unit 34, and not as a result of a meter input pulse, the microprocessor 100 checks to see whether the pressure button 42, the temperature button 44, or the system test button 46 was depressed, as shown in FIG. 5. FIG. 11 illustrates the subroutines for responding to depression of the buttons 42, 44 and 46. In the event the pressure button 42 is depressed, the TPRESS subroutine is performed. First, the appropriate data is retrieved from the pressure transducer 28 and the diode matrix card 50 and converted to hexadecimal. The pressure data is then examined to see if it is within the appropriate limits. If so, the CPGAGE subroutine (FIG. 8) is called to calculate the gage pressure. The calculated gage pressure in hexadecimal is then converted to binary coded decimal and displayed on the display 38 of the test unit 34. This is used for calibration and check purposes. The program then returns to the WSTART state.

In the event that the temperature button 42 is depressed, the TTEMP subroutine (FIG. 11) is performed. First, the temperature data from the temperature transducer 26 is obtained, converted to hexadecimal, and checked to see whether it is within prescribed limits. Next, the temperature is converted to degrees Fahrenheit and then converted to Binary Coded Decimal, in which form it is displayed on the display 38. This is used for calibration and check purposes. The program then returns to the WSTART state.

In the event that the system test button 46 was depressed, the program causes the TTEST subroutine (FIG. 11) to be performed. First, data is retrieved from the diode matrix card 50 and in place of temperature and pressure readings, the fixed constant 0505 is placed on data bus 124 via input port 123. Next, the calculations set forth in the calculation block of FIG. 5 are performed. This should result in a particular "signature" for the volume corrector apparatus. This signature is converted to Binary Coded Decimal and displayed on the display 38. The program then returns to the WSTART state.

In the event that both the system test button 46 and the cancel limit button 48 are depressed simultaneously, the program causes the TTEST subroutine (FIG. 11) to be executed. However, detection of simultaneous button pushes causes the program to read the pressure 28 and temperature 26 transducers instead of presenting the fixed number 0505 to the input port 123, and the resulting calculation proceeds according to the calculation block of FIG. 5.

All of the calculations which have been described are performed utilizing integer arithmetic, rather than floating point arithmetic. Accordingly, a large amount of memory in the ROM 120 is saved, resulting in a cost saving. In integer arithmetic $3 \div 2 = 1$ (the 0.5 is lost). However, if somewhere in the procedure there is a multiplication by 10, one may say instead that $30 \div 2 = 15$. Accordingly, in the calculations described above, there are many multiplications and divisions by powers of 10. However, the overall truncation errors are not severe and the calculations are within $\pm 0.1\%$ up to 1000 psi for all $T_f$. From 1000 to 1500 psi and flowing temperatures above 0° F. the calculations are with $\pm 0.1\%$. All accuracies are over an ambient temperature range of $-40°$ F. to $+140°$ F.

Accordingly, there has been disclosed a method and apparatus for correcting a measured unit volume of flowing gas to a base volume at given base conditions of base pressure and base temperature. It is understood that the above-described embodiment is merely illustrative of the application of the principles of this invention. Numerous other embodiments may be devised by those skilled in the art without departing from the spirit and scope of this invention as defined by the appended claims.

We claim:

1. Apparatus for recording the volume of gas flowing through a conduit, each measured unit volume being corrected to a base volume at given base conditions of base pressure and base temperature, said apparatus comprising:
   means for measuring the volume of the flowing gas and providing a volume pulse in response to measuring said unit volume;
   means responsive to said volume pulse for measuring the temperature of the flowing gas and providing a first electrical signal corresponding thereto;
   means responsive to said volume pulse for measuring the pressure of the flowing gas and providing a second electrical signal corresponding thereto;
   means for storing a first plurality of constant values;
   means responsive to said volume pulse for utilizing said stored first plurality of constant values and the measured pressure and temperature values to calculate a second constant value;
   means responsive to said volume pulse for utilizing said stored first plurality of constant values and the measured pressure value to calculate a third plurality of constant values;
   means for utilizing said calculated third plurality of constant values and the measured pressure and temperature values to calculate a supercompressibility factor;
   means for utilizing said supercompressibility factor and said second calculated constant value to calculate a correction factor;
   means for deriving a corrected volume from the measured volume and the correction factor;
   a counter;

means for converting said corrected volume into an integral number of increments for said counter plus a remainder;

means for storing said remainder; and means for incrementing said counter by said integral number of increments;

whereby a measured unit volume is corrected and recorded for every volume pulse.

2. The apparatus according to claim 1 wherein said converting means adds the previously stored remainder to the corrected volume prior to the conversion.

3. The apparatus according to claim 1 wherein the storing means includes an interchangeable diode matrix board.

4. The apparatus according to claim 1 wherein the storing means includes a programmable read only memory.

5. The apparatus according to claim 1 further including a display and an operator actuable switching element, said apparatus responding to actuation of said switching element for activating said display to display the pressure of the flowing gas.

6. The apparatus according to claim 1 further including a display and an operator actuable switching element, said apparatus responding to actuation of said switching element for activating said display to display the temperature of the flowing gas.

7. The apparatus according to claim 1 further including a display and an operator actuable switching element, said apparatus responding to actuation of said switching element for calculating the correction factor utilizing predetermined values for the temperature and pressure of the flowing gas and activating said display to display the calculated correction factor.

8. The apparatus according to claim 1 further including a display and an operator actuable switching element, said apparatus responding to actuation of said switching element for calculating the correction factor utilizing the measured pressure and temperature values and activating said display to display the calculated correction factor.

9. The apparatus according to claim 1 further including an operator actuable switching element, said apparatus responding to actuation of said switching element for incrementing said counter.

10. The apparatus according to claims 5 or 6 further including:

means for establishing range limits for the temperature and pressure of the flowing gas;

a latch;

means responsive to either the temperature or pressure going outside its respective range for setting said latch;

means responsive to actuation of said switching element when said latch is set for activating said display to display a fault indication;

a second operator actuable switching element; and means responsive to actuation of said second switching element for resetting said latch.

11. The apparatus according to claims 5, 6, 7 or 8 wherein said display and said operator actuable switching element are contained in a separate test unit and further including means for coupling said test unit to said apparatus and means for supplying power to said test unit through said coupling means.

12. The apparatus according to claim 1 wherein all calculations are performed by a programmed digital computer utilizing integer arithmetic.

13. The apparatus according to claim 1 further including a battery adapted to power the apparatus and means connected between the battery and the apparatus for applying battery power to the apparatus only in response to said volume pulse.

14. The apparatus according to claim 13 wherein said battery is rechargeable, said apparatus further including means for recharging said battery.

15. The apparatus according to claim 14 wherein said recharging means is solar actuated.

16. The apparatus according to claim 13 further including means for monitoring the condition of said battery and means responsive to the battery condition being unsatisfactory for inhibiting all calculations by said apparatus.

17. The apparatus according to claim 16 further including means for providing a visual indication when the battery condition is unsatisfactory.

* * * * *